(12) United States Patent
Boss et al.

(10) Patent No.: US 11,877,635 B2
(45) Date of Patent: Jan. 23, 2024

(54) CARRY STRAPS FOR ELECTRONIC DISPLAY DEVICES

(71) Applicants: Todd Boss, Minneapolis, MN (US); Logan Dante Ernster, Minneapolis, MN (US); Davis J Flanagan, St. Paul, MN (US)

(72) Inventors: Todd Boss, Minneapolis, MN (US); Logan Dante Ernster, Minneapolis, MN (US); Davis J Flanagan, St. Paul, MN (US)

(73) Assignee: Todd Boss, Minneapolis, MN (US)

( * ) Notice: Subject to any disclaimer, the term of this patent is extended or adjusted under 35 U.S.C. 154(b) by 619 days.

(21) Appl. No.: 17/044,386

(22) PCT Filed: Mar. 21, 2019

(86) PCT No.: PCT/US2019/023343
§ 371 (c)(1),
(2) Date: Oct. 1, 2020

(87) PCT Pub. No.: WO2019/194978
PCT Pub. Date: Oct. 10, 2019

(65) Prior Publication Data
US 2021/0100329 A1 Apr. 8, 2021

Related U.S. Application Data

(60) Provisional application No. 62/652,703, filed on Apr. 4, 2018.

(51) Int. Cl.
*A45F 3/14* (2006.01)
*A45C 13/30* (2006.01)
(Continued)

(52) U.S. Cl.
CPC .............. *A45C 13/30* (2013.01); *A45C 13/10* (2013.01); *A45C 13/26* (2013.01); *A45F 3/14* (2013.01);
(Continued)

(58) Field of Classification Search
CPC ..... A45C 13/30; A45C 2011/003; A45F 3/14; A45F 2003/142; A45F 2200/0525
(Continued)

(56) References Cited

U.S. PATENT DOCUMENTS 5,263,423 A 11/1993 Anderson
5,474,332 A 12/1995 Yeh
(Continued)

FOREIGN PATENT DOCUMENTS

DE 20312051 U1 10/2003
EP 3846659 B1 * 10/2022 ............. A45C 13/24
(Continued)

OTHER PUBLICATIONS

Ddpstudio: walk around bookmark. Website. Retrieved Dec. 2020. https://www.designboom.com/design/ddpstudio-walk-around-bookmark.
(Continued)

*Primary Examiner* — Justin M Larson
(74) *Attorney, Agent, or Firm* — GRUMBLES LAW PLLC; Brittany Nanzig (57) ABSTRACT

A carry strap for use on electronic display devices, such as laptop computers or tablets is disclosed herein. The carry strap includes an elongate portion configured to be worn by a user that can be attached to either a second elongate portion that supports the electronic display device or to a mantle that is adhered to the electronic display device
(Continued)

through a mantle having an attachment vehicle. The attachment vehicle can include a structural or pressure-sensitive adhesive.

18 Claims, 10 Drawing Sheets

(51) Int. Cl.
*A45C 13/10* (2006.01)
*A45C 13/26* (2006.01)

(52) U.S. Cl.
CPC . *A45F 2003/142* (2013.01); *A45F 2200/0525* (2013.01)

(58) Field of Classification Search
USPC .......................................................... 224/257
See application file for complete search history.

(56) References Cited

U.S. PATENT DOCUMENTS

| | | | |
|---|---|---|---|
| 5,682,993 A | 11/1997 | Song | |
| 5,713,548 A * | 2/1998 | Boyer | F16M 13/04 224/267 |
| 6,006,970 A | 12/1999 | Piatt | |
| 6,032,339 A * | 3/2000 | D'Addario | A45C 13/1092 24/DIG. 54 |
| 6,163,450 A * | 12/2000 | Kim | G06F 1/1616 248/188.4 |
| 6,381,127 B1 * | 4/2002 | Maddali | G06F 1/163 D3/276 |
| 7,191,926 B1 | 3/2007 | Costantino et al. | |
| 7,455,339 B2 | 11/2008 | Staples | |
| D609,011 S * | 2/2010 | Cucuzza | A45F 5/12 D3/327 |
| 7,669,299 B2 * | 3/2010 | McAnelly | G10G 5/005 24/658 |
| 8,104,655 B2 | 1/2012 | Zhang | |
| 8,668,122 B2 * | 3/2014 | Case | A45F 3/02 224/661 |
| 8,801,065 B1 * | 8/2014 | Jones | G06F 1/1613 294/25 |
| 9,427,071 B2 * | 8/2016 | Rayner | A45C 13/30 |
| 9,753,494 B2 | 9/2017 | Laine et al. | |
| 2002/0008125 A1 * | 1/2002 | Caputi | A45C 13/30 224/264 |
| 2004/0217027 A1 | 11/2004 | Harris et al. | |
| 2006/0226040 A1 | 10/2006 | Medina | |
| 2009/0039124 A1 | 2/2009 | Leto | |
| 2010/0044259 A1 | 2/2010 | Wang | |
| 2011/0309121 A1 * | 12/2011 | Dooley | A45C 7/0086 224/576 |
| 2013/0221048 A1 | 8/2013 | Revels et al. | |
| 2015/0001263 A1 * | 1/2015 | Chen | F16B 5/0258 224/257 |

FOREIGN PATENT DOCUMENTS

| | | | |
|---|---|---|---|
| FR | 2732500 A1 | | 10/1996 |
| TW | 201141712 A | * | 12/2011 |
| WO | 2015164945 A1 | | 11/2015 |
| WO | 2019194978 A1 | | 10/2019 |

OTHER PUBLICATIONS

International Search Report and Written Opinion for International Application No. PCT/US20/19023343 dated Jul. 30, 2019; date of filing: Mar. 21, 2019; 10 pp.
European Extended Search Report pertaining to corresponding European Patent Application No. 19782263.8, dated Nov. 18, 2021.
Gear: A shoulder strap for your laptop. Website. Retrieved Aug. 13, 2021. https://www.budgettravel.com/article/gear-a-ashoulder-strap-for-your-laptop.

* cited by examiner

CARRY STRAPS FOR ELECTRONIC DISPLAY DEVICES

CROSS-REFERENCE TO RELATED APPLICATIONS

This application is a U. S. national stage application that claims priority of PCT Patent Application, Ser. No. PCT/US19/23343, filed Mar. 21, 2019 and titled "CARRY STRAPS FOR ELECTRONIC DISPLAY DEVICES" which in turn claims the benefit of U.S. Provisional Application Ser. No. 62/652,703, filed Apr. 4, 2018, and titled, "COMPUTER CARRY DEVICES", both of which are herein incorporated by reference in their entireties.

FIELD OF THE INVENTION

This disclosure relates to articles for carrying electronic display devices, and more particularly, devices for carrying laptop computers and tablets.

BACKGROUND

Computer manufacturers continue to make impressive progress in reducing the bulk and weight of electronic display devices, such as laptop computers. Such electronic devices are becoming increasingly portable. However, most of the devices either come embedded in rigid cases of plastic or metal that close like a clam shell in which the outer side of the closed electronic device also acts as a self-contained protective case. Or, in the case of tablets or cell phones, the electronic devices are produced with a rigid case on the back and a display on the front. In order to transport these portable electronic devices, the user either needs to use a bulky case or bag with a strap or carry it by hand.

SUMMARY

There is a need for an article that the user can easily attach to an electronic device and also to which a carry strap can be attached. Provided herein is disclosure of such an article that allows the user of various electronic display devices to attach carry straps to the device and then use the strap to carry the device, typically by looping the carry strap around the torso, neck, or shoulders. Further provided herein is a method of carrying a computer or similar electronic article by attaching a laptop carry strap to the electronic device and then carrying the electronic device by using the laptop carry strap.

In one aspect, a laptop carry strap is provided that includes a first elongate portion structured and configured to be worn by a user and a second elongate portion structured and configured to be placed between a screen part and a main part of laptop computer proximal a hinge connecting the screen part and the main part, the second portion extending away from the laptop computer. The first end of the first elongate portion can be connected to a first end of the second elongate portion, and a second end of the first elongate portion is connected to a second end of the second elongate portion, such that the first elongate portion and the second elongate portion can form a continuous loop. The first elongate portion and the second elongate portion can be structured and configured with sufficient strength to support the laptop when the second elongate portion is positioned between the screen part and the main part of laptop computer proximal the hinge and the laptop carry strap is worn by the user.

In another aspect, a laptop carry strap is provided that includes an elongate portion structured and configured to be worn by a user. The provided strap can include at least one releasable connection port disposed upon it and a mantle, having an inner side and an outer side. The mantle can include at least one connector that is configured to form a removable connection with the connection port disposed upon the elongate portion of the strap. The provided laptop carrying strap can further include a computer having a case. The case can have a front side and a back side and a hinge disposed between the front side and the back side. An attachment vehicle can be disposed upon and attached to the mantle and configured to attach the mantle to the computer case. The attachment vehicle can have sufficient strength to support the computer when the strap is worn by a user. In some embodiments, the mantle can have at least two connectors disposed upon it. In other embodiments, the mantle can have at least two removeable connectors attached to it. In some embodiments, the mantle can have two or more attachment vehicles disposed upon it. In some embodiments, the mantle can include a spine that can be disposed between the mantle and the computer case. The mantle can have ventilation holes through it allowing for cooling of the laptop computer. In other embodiments, removable connector can be attached to the spine.

In yet another embodiment, a method is provided that includes attaching a laptop carry strap to a computer that includes a case. The laptop carry strap can include an elongate portion structured and configured to be worn by a user. The laptop carry strap can include at least one connection port disposed upon it and a mantle. The mantel can have an inner side and an outer side and can include at least one removeable connector. The connectors can be configured to form a connection with the connection port on the elongate portion. The laptop computer strap can also include a computer having a case. The case can have a front side and a back side. An attachment vehicle is disposed upon and can be attached to the mantle. The attachment vehicle can be configured to attach the mantle to the computer case. The attachment vehicle can have sufficient strength to support the computer when the strap is worn by a user. The method can further include carrying the computer by using the laptop carry strap.

The provided laptop carry strap can allow the user to easily attach the carry strap to an electronic device, such as a laptop computer. The provided article also can allow the user of various electronic display devices to attach carry straps to the device and then use the strap to carry the device, typically by looping the carry strap around the neck or shoulders. The provided laptop carry strap can be relatively inexpensive and can be easily applied by the user to any electronic device.

In this application, the term:

"attachment vehicle" refers to a layer or article that serves the function of permanently, semi-permanently, or even temporarily attaching a mantle of the provided disclosure to an electronic display device. This can include adhesives, primed adhesives, hook and loop fasteners, lassos or snares that loop around a hinge, screws, replacement device feet, or attachments to existing device feet, clips or cables.

"between" refers to an element (usually a layer) that is sandwiched inside of two other elements. There may or may not be additional elements present inside of the construction;

"computer" is used in the present disclosure to refer to electronic display devices that have at least one electronic display and at least one outer protective side. In this context, the electronic display device is typically a laptop computer with a clam shell closure configuration having a screen side and a main side that close together so that an outside shell protects the inward facing screen side and main side, a tablet that includes an electronic display on one side and an outside shell on the other side, or a smart phone or pod device;

"disposed upon or disposed thereupon" refers to having one element (usually a layer) that is on top of another element. There may or may not be additional elements (layers) between the two original elements;

"elongate portion" refers to the portion of a provided electronic device carry strap that is connected to the device and is configured to be worn around or grabbed by a user;

"mantle" refers to a body that directly or indirectly connects an elongate portion of a provided carry strap to an electronic display device. The mantle may be in the shape of a folded sheath with at least one connector and two or more attachment vehicles disposed upon thereon, or the mantle may be in the shape of a button (any shape) having a single attachment vehicle and a single connection port disposed thereon;

"pocket" refers to a small compartment configured to hold stationery items as disclosed herein;

"pressure-sensitive adhesive" refers to a substance that is a type of non-reactive adhesive which forms a bond when pressure is applied to bond the adhesive with the adherend. No solvent, water, or heat is needed to activate the adhesive;

"reversible connection" refers to a connection having at least two parts—usually a male connection part and a female connection part that can snap or fit snugly together but also can be taken apart by a user;

"spine" refers to a feature that may be part of a mantle. A spine in the disclosed laptop carry strap may lie between a computer case (typically over the hinge) and may be used to anchor connectors thereto. In some embodiments, the hinge may have ventilation holes through it that line up with ventilation holes in the spine or elsewhere in the mantle thereby allowing hot air generated by a computer to escape;

"strap" refers to any elongate element that is configured to attach through connection ports to a computer. The strap can be narrow or wide and may be made of many different types of materials. The strap may also have different widths or materials along its length; and "structural adhesive" refers to an adhesive that hardens or cures into a material capable of holding two or more substrates together, bearing the forces involved for the lifetime of the product. In this disclosure, structural adhesives may react and cure chemically, photochemically, or using other catalysts such as moisture, or may be applied hot or warm and then harden by cooling.

The above summary is not intended to describe each disclosed embodiment of every implementation of the present disclosure. The brief description of the drawings and the detailed description which follows more particularly exemplify illustrative embodiments. In the drawings, the layers are not necessarily drawn to scale.

BRIEF DESCRIPTION OF THE DRAWINGS

The following description should be read with reference to the drawings. The drawings, which are not necessarily to scale, depict examples and are not intended to limit the scope of the disclosure. The disclosure may be more completely understood in consideration of the following description with respect to various examples in connection with the accompanying drawings, in which.

DETAILED DESCRIPTION

This disclosure relates to articles for carrying electronic display devices such as laptop computer or computer tablets, and more particularly, laptop carrying straps. Various embodiments are described in detail with reference to the drawings, in which like or related reference numerals may be used to represent like parts and assemblies throughout the several views. Reference to various embodiments does not limit the scope of the systems and methods disclosed herein. Examples of construction, dimensions, and materials may be illustrated for the various elements, those skilled in the art will recognize that many of the examples provided have suitable alternatives that may be utilized. Any examples set forth in this specification are not intended to be limiting and merely set forth some of the many possible embodiments for the systems and methods. It is understood that various omissions and substitutions of equivalents are contemplated as circumstances may suggest or render expedient, but these are intended to cover applications or embodiments without departing from the spirit or scope of the disclosure. Also, it is to be understood that the phraseology and terminology used herein are for the purpose of description and should not be regarded as limiting.

One aspect of a disclosed carrying strap for electronic display devices is provided herein. An embodiment of the provided carrying strap for a laptop computer includes a first elongate portion that is structured and configured to be worn by a user. The carrying strap can be made of a number of materials such as leather, vinyl, fabric, yarn, cords, woven fabric, nonwoven fabric, or metal.

The first elongate portion can have two ends each of which is configured to be reversibly connected to two respective ends of the second elongate portion described below. The strap can be any length but, in most useful embodiments, can have a length that allows the strap to be slung around one or both shoulders of the user and can allow the laptop computer to hang at a comfortable distance from the ground when it is attached to the second elongate portion of this embodiment of the carrying strap. In some embodiments, the strap can be from about 0.1 m to about 3.0 m. It can be adjusted longer or shorter depending upon the user. The strap can also have a width that is very narrow such as a cord, string, woven yarn that ranges from about 0.5 mm to about 1 cm or more. Or, the strap can be much wider such as from about 1 cm to about 5 cm or even to about 10 cm in width. In these cases, it can include a leather belt, a metallic belt, a woven belt, or other materials natural or synthetic.

The provided carrying strap includes a second elongate portion that is placed between a screen part and a keyboard part of a laptop computer, particularly a laptop computer that can close like a clam shell with the screen part and the keyboard part folded inward due to a hinge connecting the screen part and the keyboard part of the laptop computer. The second elongate portion is typically placed on the inward fold of the clam shell of the closed laptop computer and extends proximal the hinge inside the closed clam shell of the closed laptop computer. The second elongate portion can have two ends. Each end of the first elongate portion of the carry strap can be configured to reversibly attach to each end of the second elongate portion forming a closed continuous loop. When the carry strap is in use, the closed loop can be slung over part of the body such as the shoulders or neck and also can hold the closed clam shell case of the laptop computer.

Figure 1:
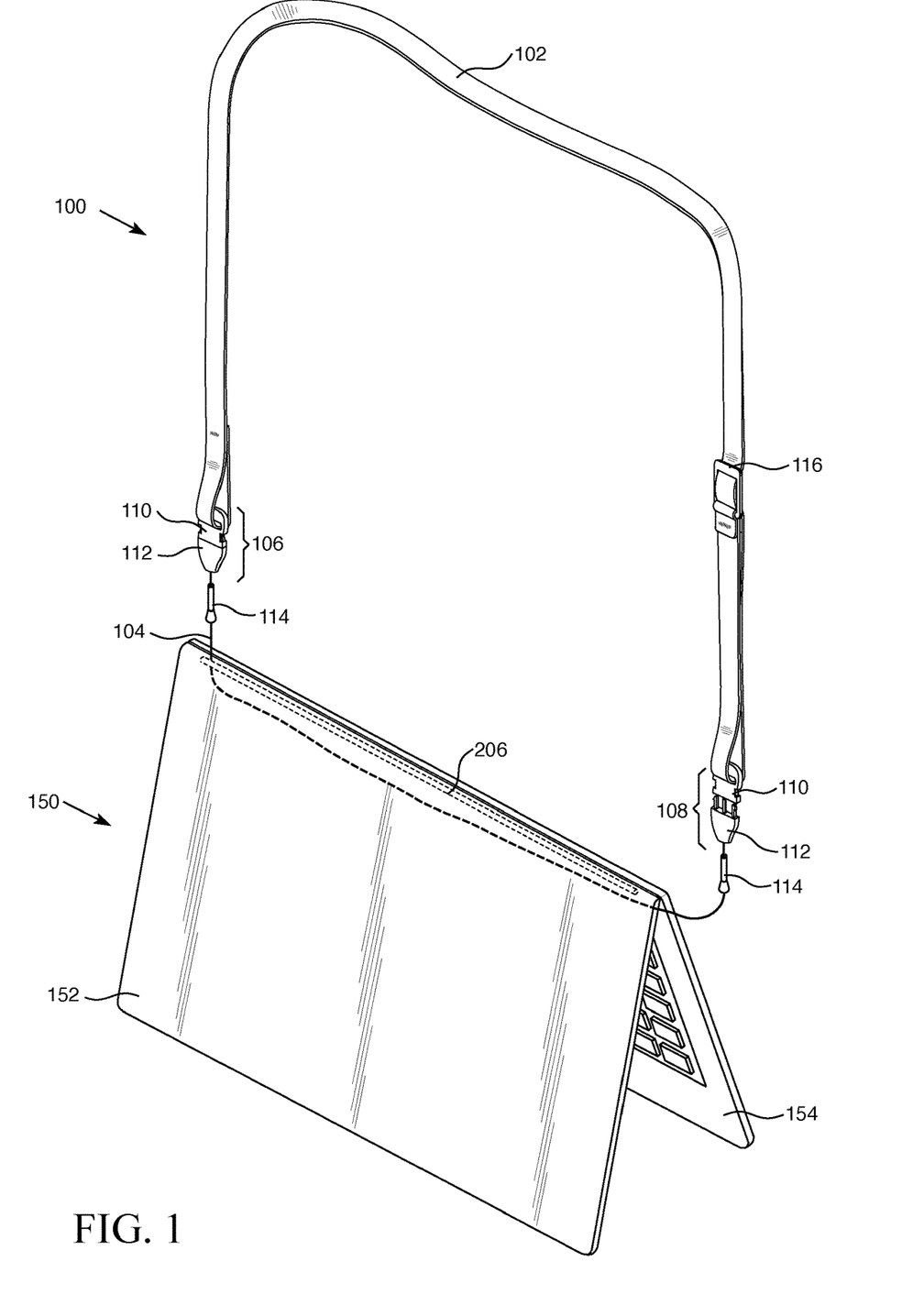
FIG. 1 is a schematic perspective illustration of an embodiment of a laptop carry strap according to the provided disclosure.

FIG. 1 is a schematic perspective illustration of an example of a laptop carry strap 100 of the present disclosure, shown with a laptop computer 150. Laptop carry strap 100 can be structured and configured to be held, worn, or otherwise carried by a user, such as over a shoulder, across the torso, or from one's hand. Laptop carry strap 100 includes first elongate portion 102 that has first end 110 and second end 112. Attached to first end 110 is joined releasable connector 106. First end 110 is configured to attach to connector port 114 at first end of second elongate portion 104 of the provided laptop carry strap. Second end 112 of first elongate portion 102 is attached to removable connector 108 (shown as exploded). Removable connector 108 can attach to connector port 114 and is configured to attach to connector port 114 at second end of second elongate portion of the provided laptop carry strap. Second elongate portion 104 is positioned between screen part 152 and main part 154 of laptop computer 150 proximal hinge 107 of laptop computer 150. When both ends of first elongate portion are connected to both ends of second elongate portion, laptop carry strap 100 forms a continuous loop and can be easily worn by the user.

Figure 2:
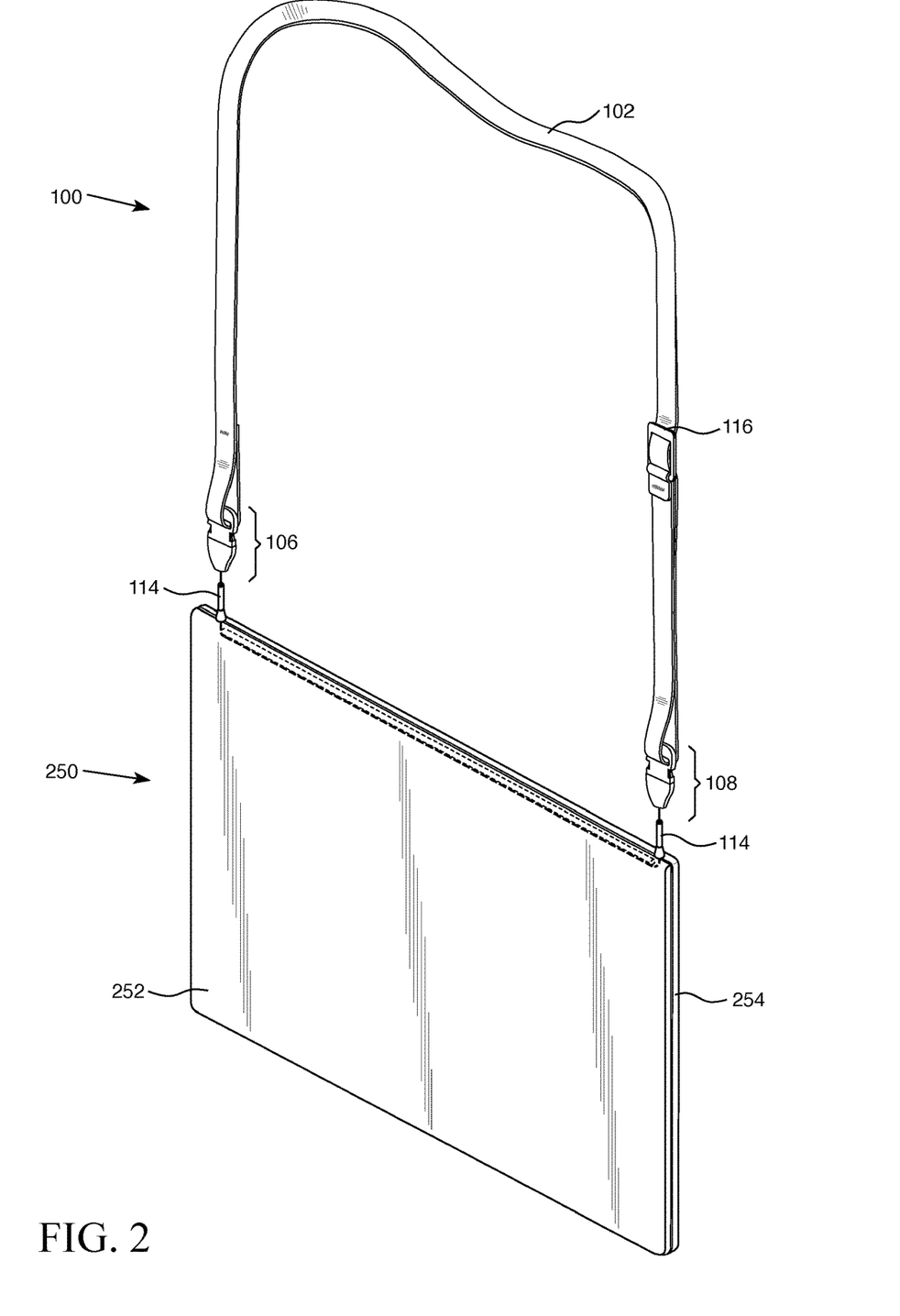
FIG. 2 is a perspective illustration of the laptop carry strap of illustrated in FIG. 1 with the strap positioned for use as a carrying strap for the laptop.

FIG. 2 is a perspective illustration of the laptop carry strap illustrated in FIG. 1 with laptop carry strap 200 positioned for use as a carrying strap for laptop 250. Laptop computer 250 is shown closed and, when both ends of the first elongate portion and the second elongate portion of the provided laptop carry strap are connected, they can form a continuous loop ready for use by a user.

Figure 3:
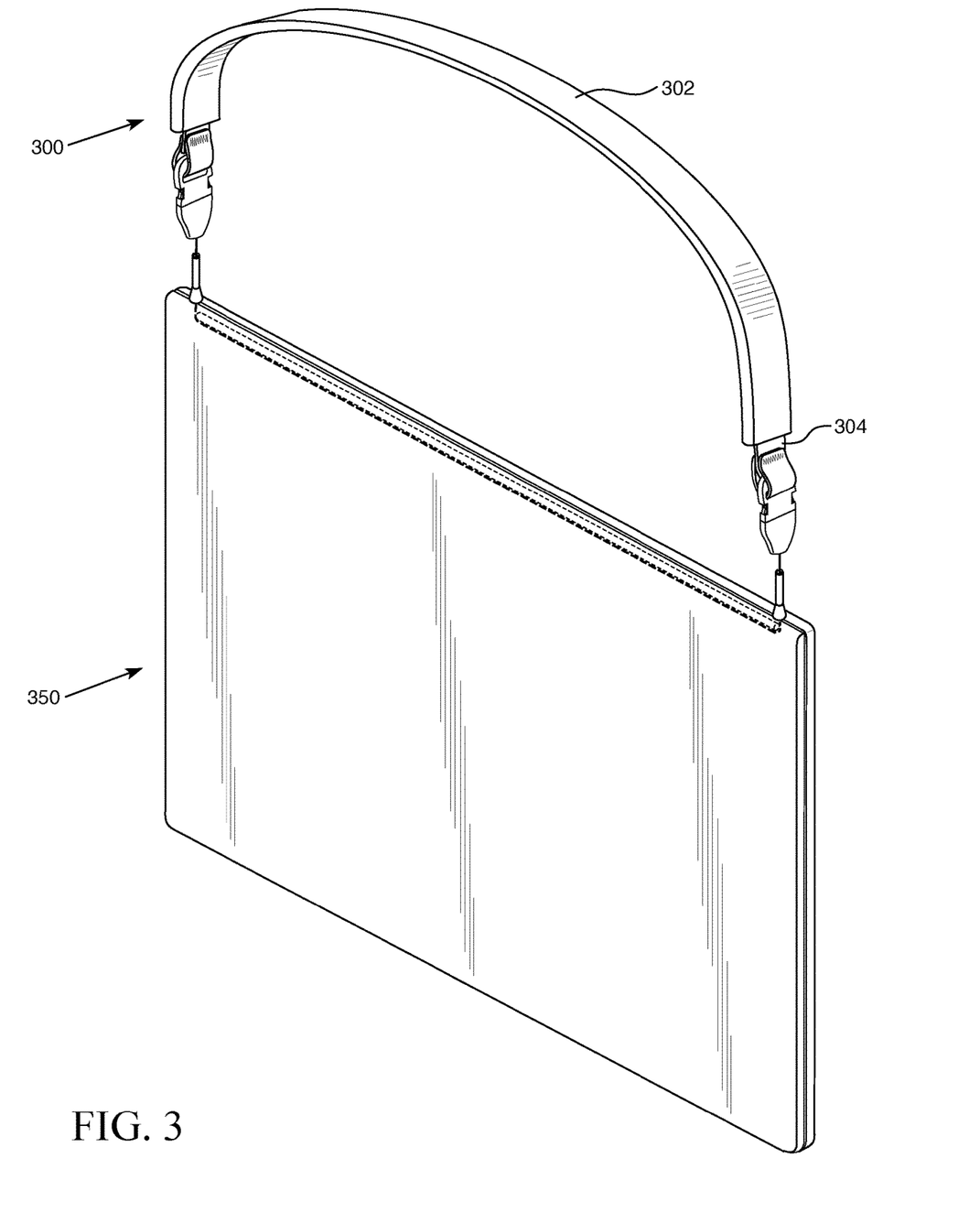
FIG. 3 is a perspective illustration of another embodiment of a laptop carry strap positioned for use as a carrying strap for the laptop according to the provided disclosure.

FIG. 3 is yet another perspective illustration of another embodiment of the provide laptop carry strap. In this embodiment, laptop carry strap 300 is illustrated with the first elongate portion that includes wide portion 302 and narrow portion 304 that can be combined as shown or in many other ways to carry laptop computer 350. FIG. 3 is an illustration of just one embodiment of laptop carry straps that include more than one width. Although the embodiment illustrated in FIG. 3 shows wide portion 302 and narrow portion 304 of the first elongate portion, other embodiments are contemplated that may, if desired, include additional wider or narrower portions across the length of the first elongate portion for decorative or functional purposes as the user desires.

Figure 4:
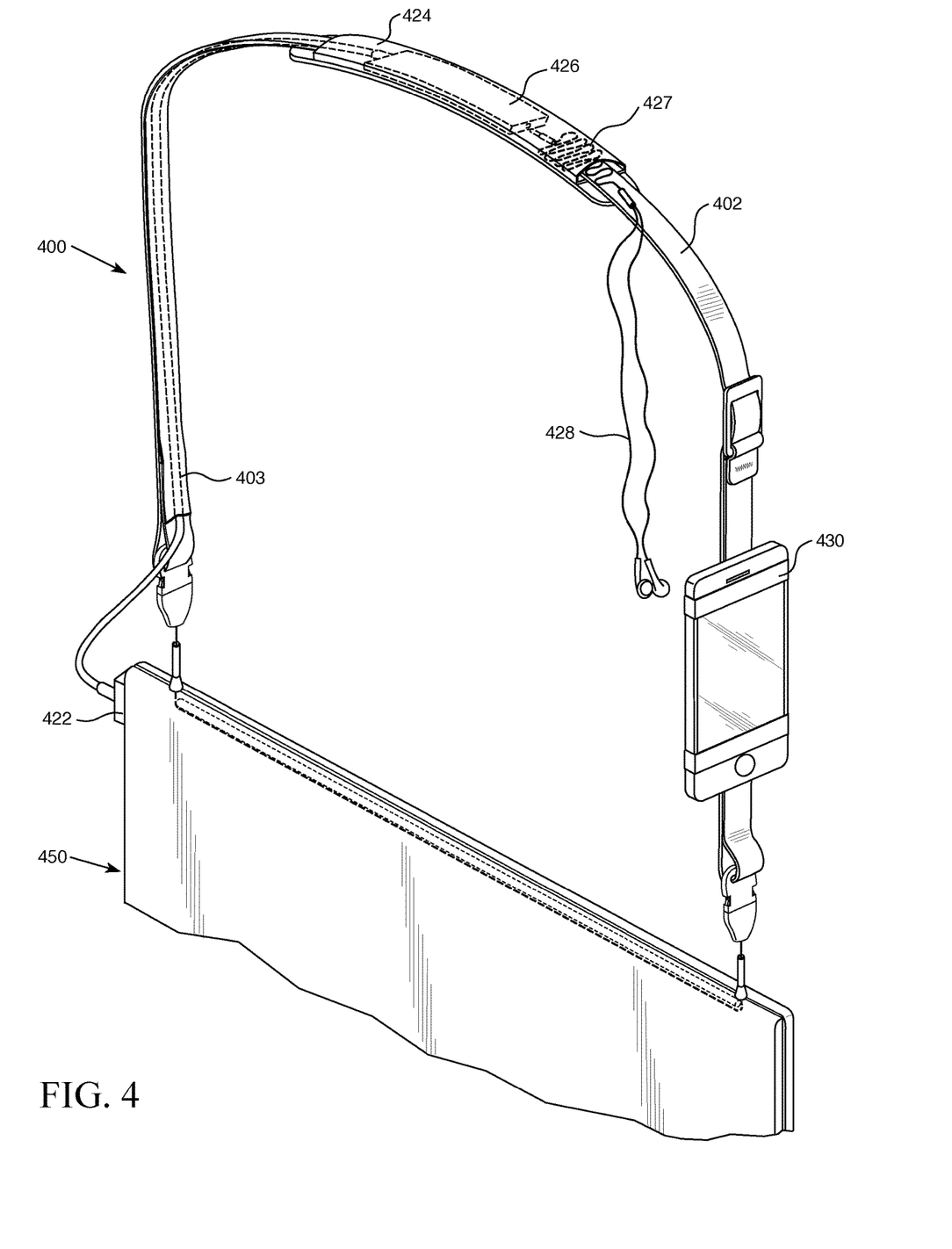
FIG. 4 is a perspective illustration of another illustrative example of a laptop carry strap according to the provided disclosure.

FIG. 4 is a perspective partial illustration of an embodiment of the provided laptop carry strap that includes several additional features. Laptop carry strap 400 includes first elongate portion 402 as shown in the previously illustrated embodiment described above. Additionally, first elongate portion can include strap pad 424. In FIG. 4 strap pad 424 fits around first elongate portion 402 and includes battery 426. Battery 426 can be configured to power or recharge laptop computer 450 or other electronic device through power cable 403 and power connection 422. For example, power cable 403 can connect to laptop computer 450 through power connection 422. Power cable 403 can be attached in any manner desired to first elongate portion 402. In the embodiment illustrated in FIG. 4, power cable 403 is embedded inside or attached to the inner part of the first elongate portion as shown. Strap pad 426 also includes a compartment configured to store excess wire that connects to cell phone 430 as shown.

Figure 5A:
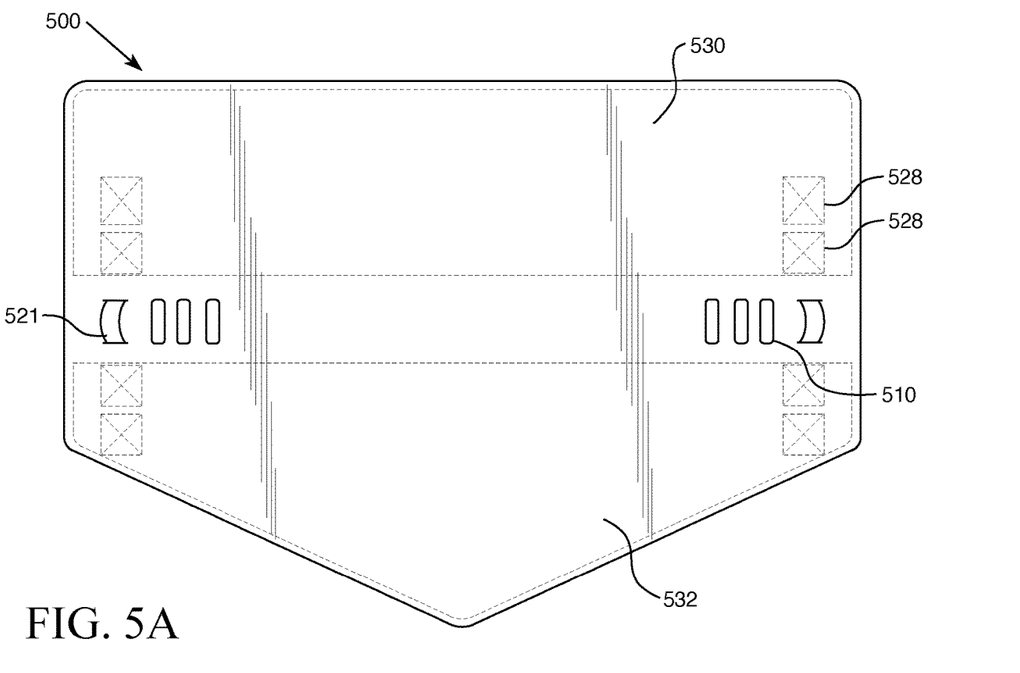
FIGS. 5a and 5b are schematic illustrations of an embodiment of the topside (FIG. 5a) and the underside (FIG. 5b) of an embodiment of a mantle such as that disposed upon a closed laptop computer as shown in FIGS. 6a and 6b.
Figure 5B:
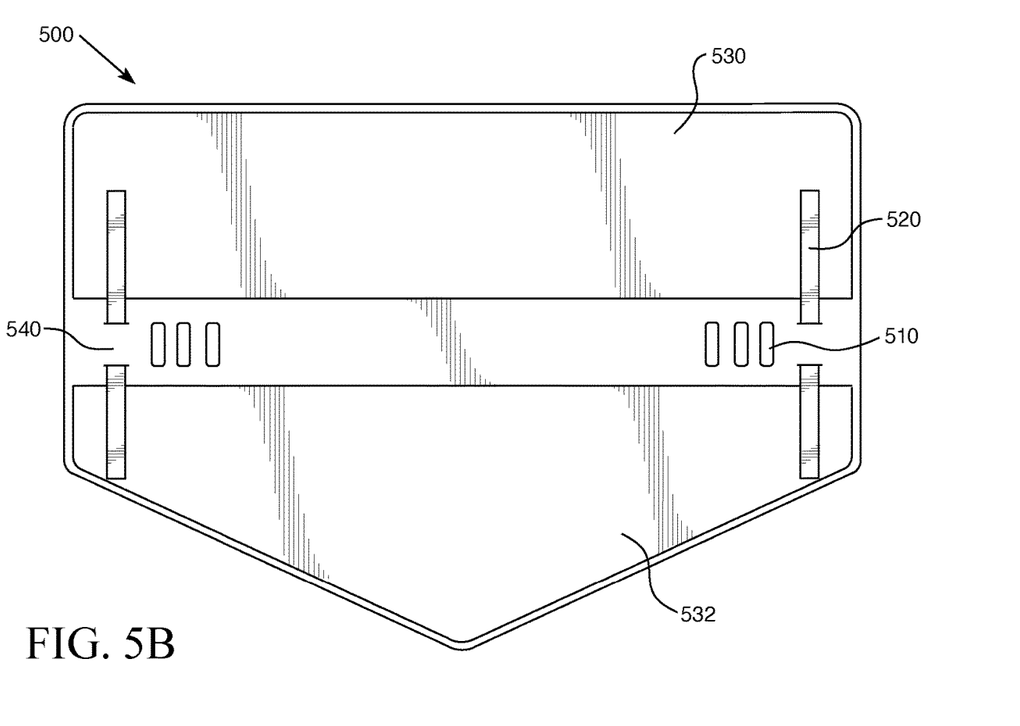

FIGS. 5*a* and 5*b* are plan views (outer side and inner side, respectively) of a mantle useful in another embodiment of the provided laptop carry strap. Top (outer) side of mantle 500 is illustrated in FIG. 5*a*. Mantle 500 can be made from many materials such as leather, vinyl, reinforced plastic, metal, metal foil, reinforced fabric such as fabric embedded with a mat-like binder or fabric intercalated with a polymeric coating, tapestry, woven or nonwoven materials, rubber, nylon synthetics, or any blended hybrid of these. Mantle 500 can include one or more attachment vehicles (two, 530 and 532 are illustrated in FIGS. 5*a* and 5*b*). In some embodiments, the attachment vehicles can include adhesives such as structural adhesives (hot melt applied adhesive) or pressure-sensitive adhesives. Examples of useful structural adhesives can include, but are not limited to cyanoacrylate adhesive, epoxy adhesives, methacrylate adhesives, urethane adhesives and various types of hot melt adhesives. If the mantle has two or more attachment vehicles they may be the same or different materials. Examples of pressure-sensitive adhesives useful in this disclosure can include VHB bonding tape (from 3M, St. Paul, MN), as well as acrylic foam adhesives, silicone adhesives, and other structural pressure-sensitive adhesives known to those of ordinary skill in the art. Also contemplated as useful attachment vehicles include hook and loop fasteners, snap connectors, and removable adhesives, to name a few. As used herein, removable adhesives are adhesives that can provide sufficient strength (typically shear strength) to hold the provided electronic display devices but can be removed by mechanisms such as, for example, shearing in a plane normal to the direction of force needed to work in the intended laptop carry articles. Exemplary adhesives are commercially available from 3M, St. Paul, MN under the tradename, COMMAND. Provided mantles can include, for example, reinforcement items such as spine 540 (shown on inner side of mantle in FIG. 5b) which, in some embodiments, can run the length of mantle 500. Spine 540 can be attached to or integrally be a part of mantle 500, if desired and can be fastened to the mantle by any methods known to those of ordinary skill. Spine 540 can have one or more loop bodies 520 attached thereon. The spine can be attached to the inner side of the mantle by, for example, sewing (as illustrated in FIG. 5b), hook and loop fasteners, adhesive application. A portion of loop body 520 can protrude through an opening in the spine and mantle to form loop 521 to which a connection port such as connection port 114 (shown, for example, in FIGS. 1-4 and 7) can be attached. In the embodiment illustrated in FIGS. 5a and 5b, the connection port can be attached to loop 521 by for example, tying, looping through, threading, or lassoing in whole or in part. The provided mantles can include ventilation holes that extend through mantle, including the spine of the mantle. The ventilation holes can be in any pattern and can extend partially or fully across the spine. In some embodiments, the mantle extends along the back side of a computer case. In some embodiments, the mantle, when extended along the back side of a computer case at least partially covers the hinge of the computer. It is typical for laptop computers to have a cooling fan that outlets through the body of the computer. Typically, the cooling fan outlets exit the computer body in proximity to the hinge between the main part and the screen part of the laptop computer. In some embodiments, the mantle with ventilation holes lies in close proximity and aligned with the cooling fan outlet of the computer allowing for heat to be dissipated from the computer. In these embodiments, the mantle can extend along the back side of the computer case and at least partially cover the hinge.

The attachment vehicle can be disposed upon and attached to the mantle and can be configured to attach the mantle to a computer case (shell side of a laptop, a tablet, or a smart phone, for example). The attachment vehicle needs to have sufficient shear strength and modulus to support the computer when the provided strap is worn by a user. Typical laptop computers are the heaviest types of electronic devices contemplated by the present disclosure. They can weigh, for example, up to 0.5 kg, up to 1 kg, up to 2 kg, up to 5 kg, or even more. With no acceleration (i.e., being held stationary by a user) this corresponds to about up to 0.5 N, up to 1.0 N, up to 2 N, up to 5N, of force or even more. However, if the laptop is under acceleration, such as being lifted up off of the floor or the table, the amount of force that needs to be withstood by the attachment vehicle is larger. The attachment vehicle (or sum of multiple attachment vehicles) must be able to withstand this force (typically a shear force) in order to be useful for the intended purpose of carrying the laptop or other electronic device.

Figure 6A:
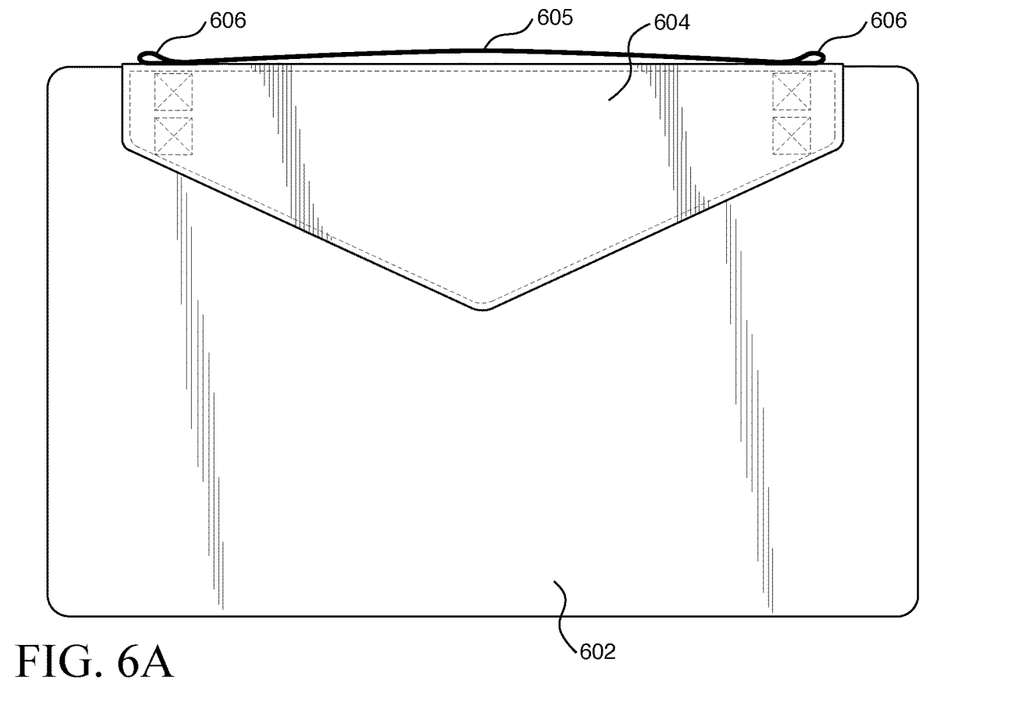
FIGS. 6a and 6b are plan views of a part of one embodiment according to the provided disclosure illustrating how the mantle is disposed upon the topside (FIG. 6a) and underside (FIG. 6b) of a closed laptop computer case.
Figure 6B:
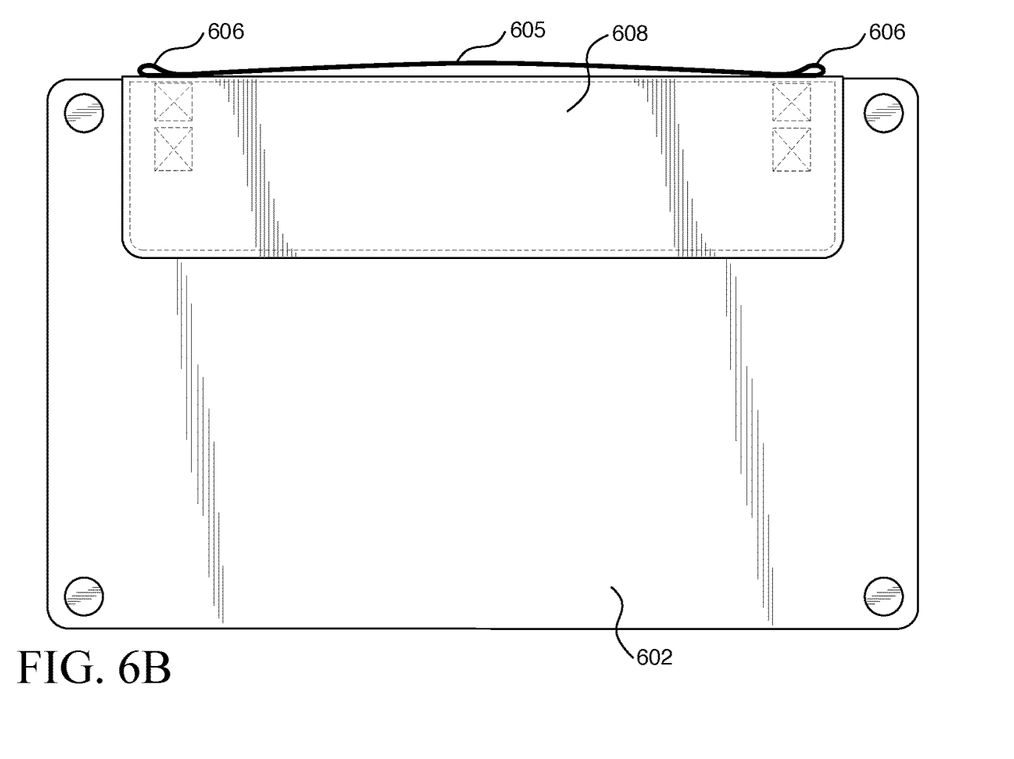

FIGS. 6a and 6b are plan views of a part of one embodiment according to the provided disclosure illustrating how the mantle is disposed upon the topside 604 (FIG. 6a) and underside 608 (FIG. 6b) of closed laptop computer case 602. In the illustrated embodiment is shown attachment loop 606. Attachment loop 606 can be attached to the top of the computer case, above the hinge by external connection to the mantle. The attachment loop can include one loop, two loops, or even more loops for attachment to, for example, a first elongate body of a laptop carry strap according to the disclosure. The attachment loop can include one or more individual loops attached to the mantle. Alternatively, and as illustrated in FIGS. 6a and 6b, connecting strap 605 can be one piece that can be attached to the mantle over the hinge part of the laptop computer with two attachment loops 606. The one piece can include one, two, or more attachment loops. In this configuration, connecting strap 605 can also serve as the first elongate portion of a provided laptop carry strap and can be used by the user to carry the laptop.

Figure 6C:
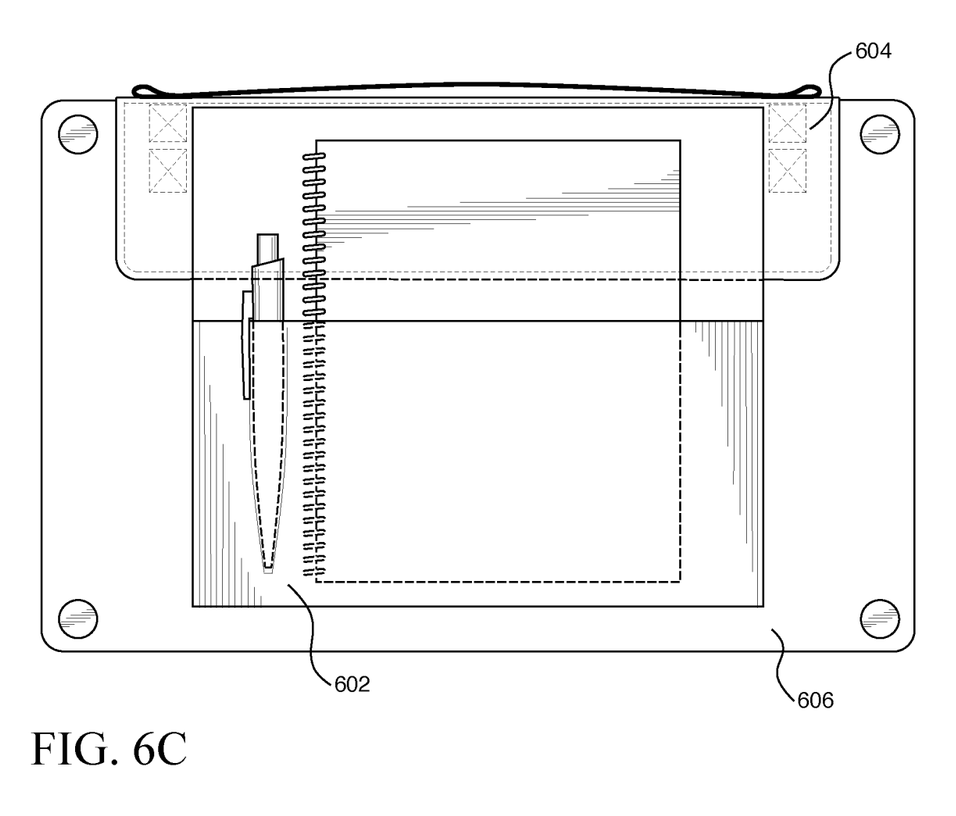
FIG. 6c is a plan view of the mantle illustrated in FIG. 6b that also includes a pocket for holding stationery supplies disposed upon the mantle.

In some embodiments, the mantle can have a pocket configured to store stationery supplies such as writing implements (pens, pencils, markers, for example), small notebooks, or even small electronic devices such as electronic tablets or smart phones. The pockets can be attached to the outer side of the mantle (side opposite the attachment vehicle) by any fastening means mentioned in this disclosure or known to those of ordinary skill in the art. In the embodiment illustrated in FIG. 6c pocket 602 is attached to portion of the mantle 604 and/or computer outer case 606.

Figure 7:
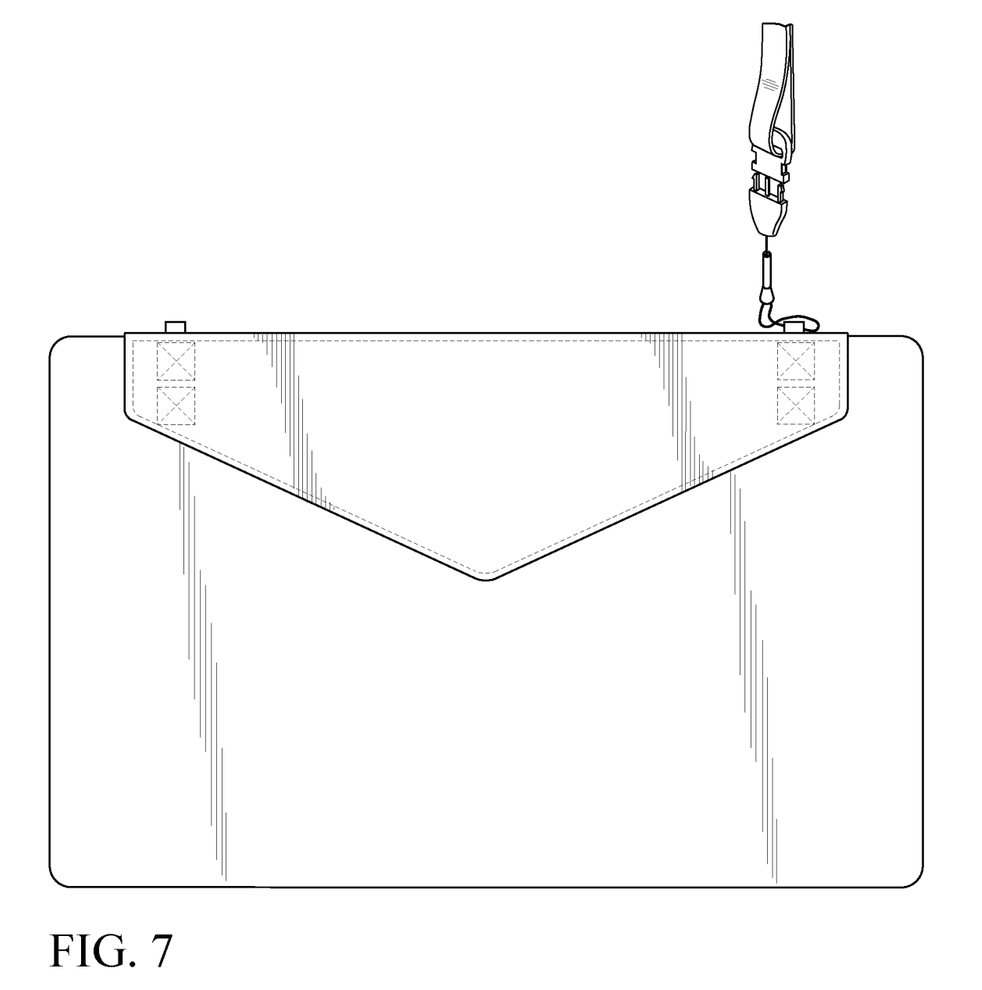
FIG. 7 is a plan view of the embodiment of the present disclosure shown in FIG. 5a showing a connector attached to the spine of the mantle of that embodiment that has formed a removable connection with a first end of the elongate portion of a laptop carry strap according to the present disclosure.

FIG. 7 is a plan view of the embodiment of the present disclosure shown in FIG. 5a showing a connector attached to the spine of the mantle of that embodiment that has formed a removable connection with a first end of the elongate portion of a laptop carry strap according to the present disclosure. In this illustrative case, a connection port as shown, for example, in FIG. 1, is attached to an attachment loop as shown in FIG. 5a and a releasable connector is then attached to the connection port as shown, for example, in FIG. 1 above.

In some embodiments, the mantle includes one or more buttons that have an attachment vehicle on one side proximal to a laptop computer case and an attachment loop mechanically fastened to or integral to the button itself. The provided buttons can include a button base that can made of metal, rigid polymer, semirigid polymer such as rubber or latex, wood, or plastic. In some embodiments, at least two buttons can be disposed upon a computer case, both on the back side of the computer case, or at least one button on the front side of the computer case and at least one button on the back side of the computer case. In some embodiments, an attachment vehicle such, as an adhesive, can be disposed directly upon one side of the button base. In some embodiments, it may be necessary to include an adhesion promoter between the attachment vehicle and the base. Adhesion promoters can be physical such as abrasion of the base surface, corona treatment of the base surface, or may be chemical such as primers useful on the base surface. Examples of useful primers for polyolefin surfaces may include LOCTITE SF 770 primer, available from Grainger, Miami, FL, or SCOTCH-WELD AC79 adhesive primer, available from 3M, St. Paul, MN Other adhesion promoters well known to those of ordinary skill in the art may be useful for other surfaces.

Figure 8:
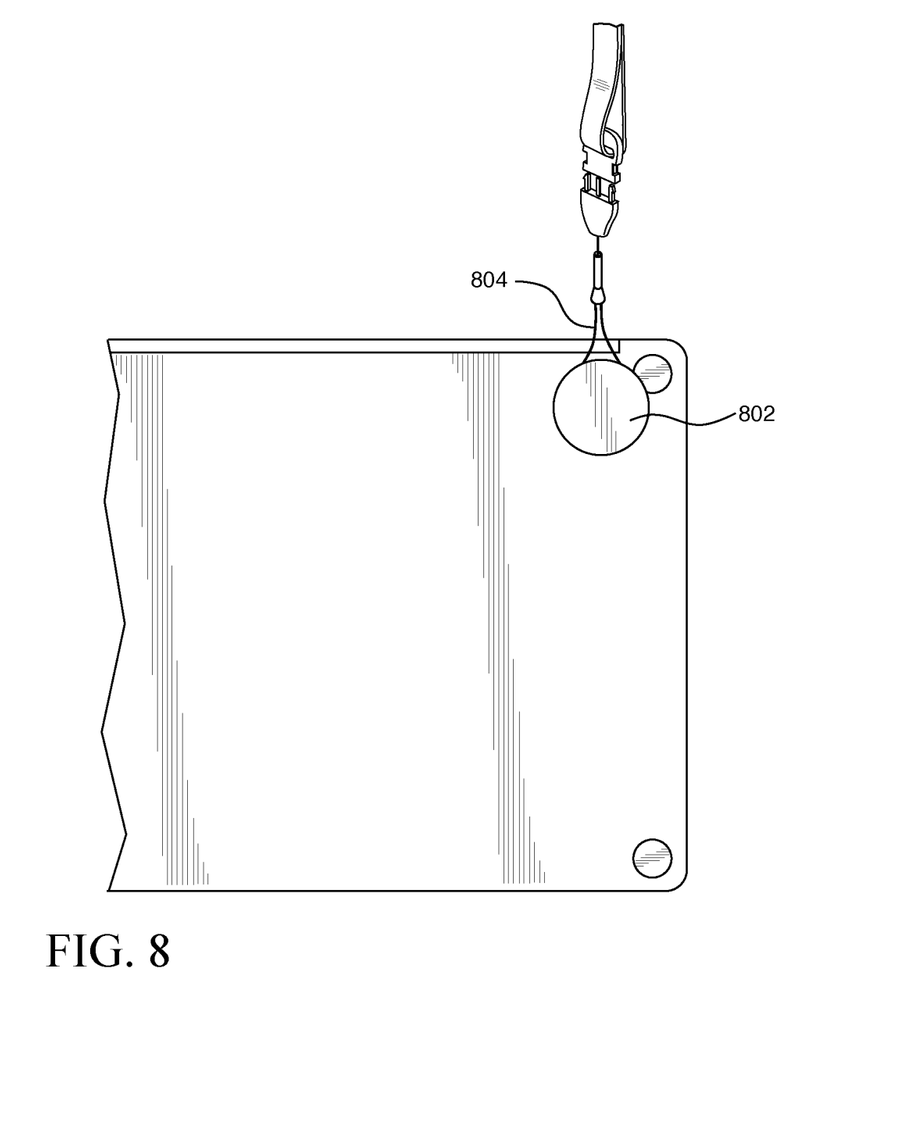
FIG. 8 is a plan view of another embodiment of the present disclosure shown in FIG. 5a showing a connector attached to the spine of the mantle of that embodiment that has formed a removable connection with a first end of the elongate portion of a laptop carry strap according to the present disclosure wherein the mantle comprises a button.

FIG. 8 is a plan view of another embodiment of the present disclosure shown in FIG. 5a showing a connector attached to the spine of the mantle of that embodiment that has formed a removable connection with a first end of the elongate portion of a laptop carry strap according to the present disclosure, wherein the mantle comprises a button as described in the paragraph above. In this embodiment, button 802 is shown adhered to the back side of a laptop computer case. Attached to button 802 is show attachment loop 804. In some embodiments, two or more buttons may be attached to the same side or different sides of a laptop computer case.

Figure 9:
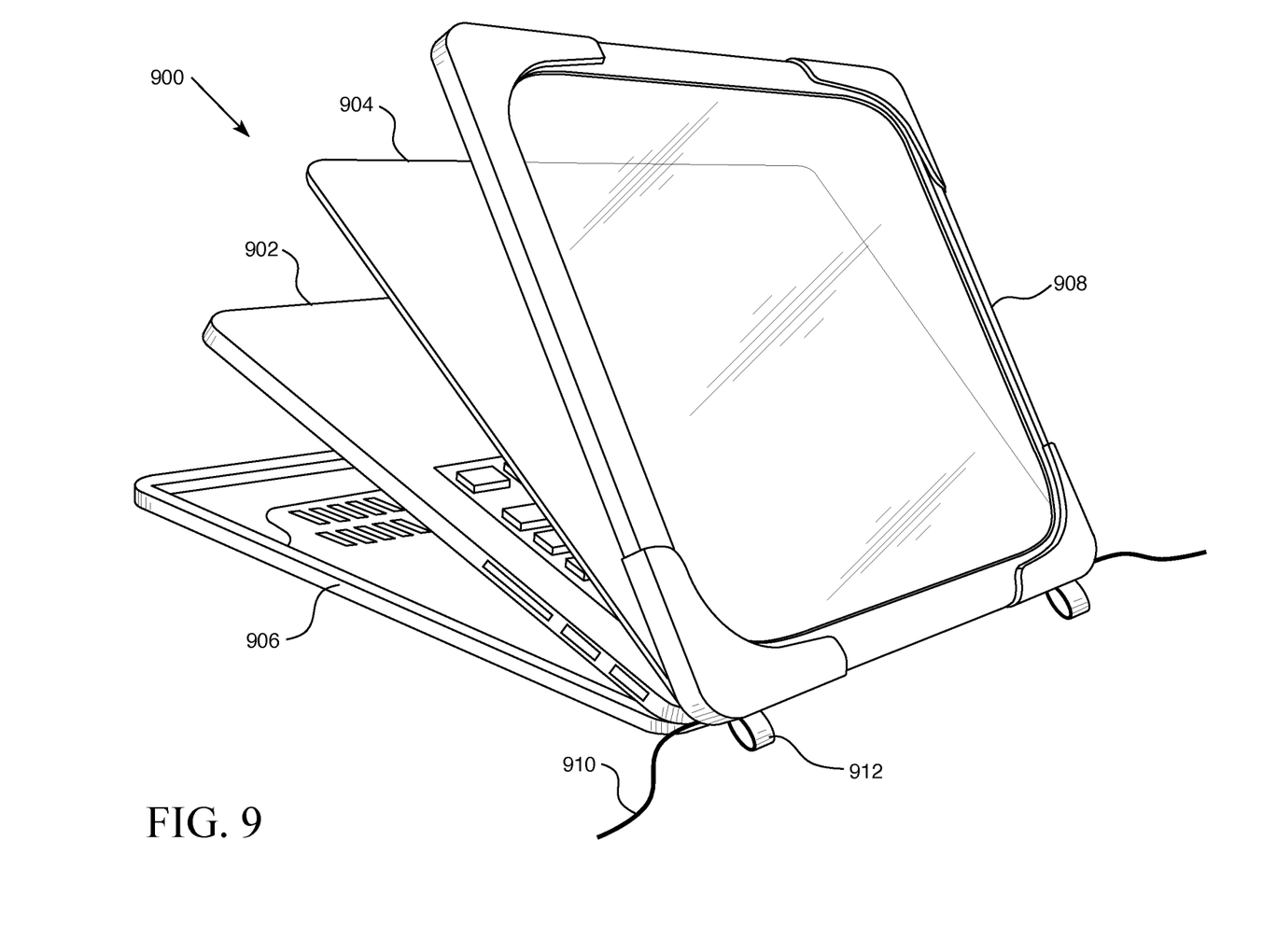
FIG. 9 is a perspective view of an embodiment of the present disclosure that includes a mantle in the form of a clam shell snap fit connector.

In another embodiment, the mantle can be configured to at least partially enclose the laptop computer. In this embodiment, the mantle can act as a protective case and can reversibly secure the laptop computer disposed within it by, for example, a snap fit configuration. In this configuration, the mantle has a shell that conforms at least partially to the shape of the laptop computer. In some embodiments, the mantle can enclose the laptop computer using a clam shell configuration as is illustrated in FIG. 9. The laptop computer can reversibly attach to the mantle by snapping the computer into the preformed shell.

FIG. 9 illustrates one embodiment of this disclosure. Laptop carry strap 900 includes laptop computer 902 (keyboard side) and 904 (screen side) that is at least partially enclosed by mantle 906 and 908 (keyboard shell and display shell, respectively). In this configuration, laptop keyboard part 902 can be interlocked by a snap fit into keyboard shell part 906 of the mantle. In some embodiments, such as the one illustrated in FIG. 9, the mantle can also have a display shell portion configured to protect the screen side of the laptop computer. At least the keyboard shell or the display shell portions of the exemplified mantle can have a snap fit with the corresponding part disposed therein. In some embodiments, both the keyboard shell and the display shell of the laptop computer can be snapped into the respective portions of the mantle.

In the embodiment illustrated in FIG. 9, the attachment vehicle is the snap fit mechanism for securing the laptop. The snap fit can be any type of connection that can reversibly hold at least a part of the laptop computer thereby securing it for attachment and use with a laptop carry strap. Other reversible connections are contemplated as would be known by those of ordinary skill in the art. FIG. 9 also shows second elongate portion 910 proximal the hinge of the laptop computer and available to connect to a first elongate portion (not shown) of a disclosed laptop carry strap that is configured to connect with the first elongate portion to form a continuous loop for carrying by a user. Alternatively, also shown are attachment loops or lassos 912 that are available for connecting to a first elongate portion of a laptop carry strap or handle by any of the ways described above.

In another aspect, a method for carrying a computer is provided that includes attaching a laptop carry strap to a computer that has an outer case. The laptop carry strap is described in the disclosure above and includes an elongate portion structured and configured to be worn by a user. The elongate portion can include at least one connection port disposed upon it. The laptop carry strap can include an elongate portion structured and configured to be worn by a user. The laptop carry strap can include at least one connection port disposed upon it and a mantle. The mantel can have an inner side and an outer side and can include at least one removeable connector. The connectors can be configured to form a connection with the connection port on the elongate portion. The laptop computer strap also can include a computer having a case. The case can have a front side and a back side and can be intimately a part of or integral to the computer and the display. An attachment vehicle can be disposed upon and can be attached to the mantle. The attachment vehicle can be configured to attach the mantle to the computer case. The attachment vehicle can have sufficient strength to support the computer when the strap is worn by a user. The method further includes carrying the computer by using the laptop carry strap. In some embodiment, the computer can include electronic devices such as a laptop computer, an electronic tablet, a "smart" phone, or other portable electronic display devices. In some embodiments, the mantle can include at least two connector ports and the laptop can be worn across the shoulder, thus supporting the computer.

The present disclosure describes minimalist laptop carry straps that can be used to carry a laptop without a laptop carry case. Other strap configurations are contemplated. In some embodiments, portions of straps as described in the present disclosure can be used with laptop carry cases. Persons of ordinary skill in arts relevant to this disclosure and subject matter hereof will recognize that embodiments may comprise fewer features than illustrated in any individual embodiment described by example or otherwise contemplated herein. Embodiments described herein are not meant to be an exhaustive presentation of ways in which various features may be combined and/or arranged. Accordingly, the embodiments are not mutually exclusive combinations of features; rather, embodiments can comprise a combination of different individual features selected from different individual embodiments, as understood by persons of ordinary skill in the relevant arts. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Various modifications and alterations to this disclosure will become apparent to those skilled in the art without departing from the scope and spirit of this disclosure. It should be understood that the embodiments presented by way of the drawings and the detailed discussion presented above are intended to be limited only by the claims set forth herein as follows. All references cited in this disclosure are herein incorporated by reference in their entirety.

What is claimed is:

1. A computer carry strap comprising:
    an elongate portion structured and configured to be worn by a user comprising at least one connection port disposed thereupon;
    a mantle, having an inner side and an outer side, comprising at least one removable connector, wherein the connector is configured to form a removable connection with the at least one connection port disposed upon the elongate portion; and
    an attachment vehicle disposed upon and attached to the mantle configured to attach the mantle to a computer case, the computer case having a front side with a front face and a back side with a back face and further comprising a hinge,
    wherein
        the attachment vehicle has sufficient strength to support the computer when the strap is worn by a user,
        a majority of a perimeter on the front face and the back face of the case remains uncovered by the mantle,
        the mantle extends along the back side of the computer case and at least partially covers the hinge,
        the mantle is in the shape of a folded sheath with a first half disposed upon the front side and a second half disposed upon the back side,
        the attachment vehicle is comprised of two or more attachment vehicles disposed upon the sheath, and
        the two or more attachment vehicles are selected from adhesives or primed adhesives.

2. The computer carry strap according to claim 1, wherein the mantle further comprises a spine that runs the length of the mantle.

3. The computer carry strap according to claim 2, wherein the removable connector is attached to the spine of the mantle.

4. The computer carry strap according to claim 1, wherein the at least one removable connector is configured to form a reversible connection with the at least one connection port.

5. The computer carry strap according to claim 1, wherein the mantle comprises leather, vinyl, reinforced plastic, metal, metal foil, reinforced fabric such as fabric embedded with a mat-like binder or fabric intercalated with a polymeric coating, tapestry, woven or nonwoven materials, rubber, nylon synthetics, or any blended hybrid of these.

6. The computer carry strap according to claim 1, wherein the mantle comprises at least two connectors disposed thereupon.

7. The computer carry strap according to claim 1, wherein the removeable connector comprises a snap connector, a hook and loop connector, a removable adhesive, a lasso, or snare.

8. The computer carry strap according to claim 1, wherein the mantle comprises at least one ventilation hole disposed therethrough.

9. The computer carry strap according to claim 8, wherein the at least one ventilation hole is located proximal to the hinge of the computer case.

10. The computer carry strap according to claim 1, wherein the elongate portion comprises a compartment configured to secure a battery, earphones, or both.

11. The computer carry strap according to claim 1, wherein the mantle is comprised of at least two adhesive buttons that are attachable directly to the computer case, wherein
   the at least two adhesive buttons are both attachable on the front side of the computer case, or
   the at least two adhesive buttons are both attachable on the back side of the computer case, or
   at least one adhesive button is attachable on the front side of the computer case and at least one adhesive button is attachable on the back side of the computer case, and
   the adhesive buttons are connectable to a loop of the attachment vehicle.

12. The computer carry strap according to claim 1, wherein the elongate portion comprises a battery configured to connect to the computer.

13. The computer carry strap according to claim 1, wherein the attachment vehicle is selected from structural adhesives, pressure-sensitive adhesives, or primed adhesives.

14. The computer carry strap according to claim 1, wherein the mantle comprises one or more buttons disposed directly upon the computer case, wherein the one or more buttons each include
   one of the attachment vehicles on one side proximal to the case, and
   one of the at least one removable connectors, wherein the removable connectors are mechanically fastened to or integral to the one or more buttons.

15. The computer carry strap according to claim 1, wherein the mantle comprises a pocket configured to hold stationery supplies.

16. The computer carry strap according to claim 1, wherein one of the first half or the second half of the mantle is rectangular in shape and the other of the first half or the second half of the mantle comes to a point in a middle portion such that it is peaked.

17. The computer carry strap according to claim 1, wherein the attachment vehicle can be permanent or removable.

18. A method for carrying a computer comprising:
   attaching a computer carry strap to a computer comprising a case, the computer carry strap comprising:
      an elongate portion structured and configured to be worn by a user comprising at least one connection port disposed thereupon;
      a mantle, having an inner side and an outer side, comprising at least one removeable connector, wherein the connectors are configured to form a connection with the at least one connection port on the elongate portion; and
      an attachment vehicle disposed upon and attached to the mantle configured to attach the mantle to the computer case,
   wherein
   the attachment vehicle has sufficient strength to support the computer when the strap is worn by a user,
   a majority of a perimeter on a front face and a back face of the computer case remains uncovered by the mantle,
   the mantle extends along the back side of the computer case and at least partially covers a hinge of the computer case,
   the mantle is in the shape of a folded sheath with a first half disposed upon the front side and a second half disposed upon the back side,
   the attachment vehicle is comprised of two or more attachment vehicles disposed upon the sheath, and
   the two or more attachment vehicles are selected from adhesives or primed adhesives; and
   carrying the computer by using the computer carry strap.

\* \* \* \* \*